United States Patent
Wang et al.

(10) Patent No.: US 8,953,111 B2
(45) Date of Patent: Feb. 10, 2015

(54) PIXEL ARRAY

(75) Inventors: Chiu-Chun Wang, Taipei County (TW); Tsung-Yuan Tsui, Taichung (TW); Chai-Ling Lai, Miaoli County (TW); Chi-Kao Tang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 685 days.

(21) Appl. No.: 12/875,099

(22) Filed: Sep. 2, 2010

(65) Prior Publication Data

US 2011/0317085 A1 Dec. 29, 2011

(30) Foreign Application Priority Data

Jun. 29, 2010 (TW) .............................. 99121230 A (51) Int. Cl.
G02F 1/1343 (2006.01)
G02F 1/1362 (2006.01)

(52) U.S. Cl.
CPC ...... *G02F 1/136213* (2013.01); *G02F 2201/40* (2013.01)
USPC .............................................. 349/39; 349/38

(58) Field of Classification Search
USPC ....................................... 349/38–39
See application file for complete search history.

(56) References Cited

U.S. PATENT DOCUMENTS

| | | | | |
|---|---|---|---|---|
| 8,035,765 | B2* | 10/2011 | Tsai et al. | 349/39 |
| 2002/0097349 | A1* | 7/2002 | Park | 349/38 |
| 2010/0053486 | A1* | 3/2010 | Shim et al. | 349/39 |
| 2010/0245679 | A1* | 9/2010 | Shohraku | 348/731 |

FOREIGN PATENT DOCUMENTS

| | | |
|---|---|---|
| CN | 1677206 | 10/2005 |
| CN | 101131515 | 2/2008 |
| JP | 10-239699 | 9/1998 |
| TW | 571267 | 1/2004 |
| TW | 200825590 | 6/2008 |
| TW | 201005407 | 2/2010 |
| TW | 201005408 | 2/2010 |

OTHER PUBLICATIONS

"First Office Action of China Counterpart Application", issued on Jun. 16, 2011, p. 1-p. 6.
"Office Action of Taiwan Counterpart Application", issued on Jan. 29, 2013, p. 1-p. 5.

* cited by examiner

*Primary Examiner* — Bumsuk Won
*Assistant Examiner* — Charles Chang
(74) *Attorney, Agent, or Firm* — Jianq Chyun IP Office (57) ABSTRACT

A pixel array includes scan lines, data lines, sub-pixel units, capacitor electrode line sets, and connecting structure sets that are all disposed on a substrate. Each sub-pixel unit has at least one active device and at least one pixel electrode electrically connected to the active device, and the active device is electrically connected to one of the scan lines and one of the data lines. Each capacitor electrode line set has N capacitor electrode lines, the N capacitor electrode lines partially overlap with the pixel electrode of each of the sub-pixel units to form a plurality of storage capacitors, and N≥2. The N capacitor electrode lines in each capacitor electrode line set are electrically connected to one another by each connecting structure set, and there is no connecting structure located between the capacitor electrode line sets having the connecting structures therein.

23 Claims, 7 Drawing Sheets

PIXEL ARRAY

CROSS-REFERENCE TO RELATED APPLICATION

This application claims the priority benefit of Taiwan application serial no. 99121230, filed on Jun. 29, 2010. The entirety of the above-mentioned patent application is hereby incorporated by reference herein and made a part of specification.

BACKGROUND OF THE INVENTION

1. Field of the Invention

The invention relates to a pixel array. More particularly, the invention relates to a pixel array of a display panel.

2. Description of Related Art

In general, a pixel structure of a liquid crystal display (LCD) includes active devices and pixel electrodes. The active devices serve as switches of LCD display units. To control each individual pixel unit, a certain pixel is usually selected by a corresponding scan line and a corresponding data line, and display data corresponding to the certain pixel are displayed through providing an appropriate operating voltage. The pixel unit further includes a storage capacitor, such that the pixel unit can be equipped with memorizing and retaining functions. Namely, the storage capacitor can store the applied operating voltage to stabilize the display image of the pixel unit.

To form the storage capacitor in the pixel unit, capacitor electrode lines are often required in the pixel unit. However, the capacitor electrode lines pose an impact on the aperture ratio of the pixel unit, and capacitive coupling effects of the storage capacitor may interfere with other signal lines. Accordingly, various capacitor electrode lines have been designed to increase the aperture ratio of the pixel unit and mitigate the interference caused by the capacitive coupling effects. Here, the capacitor electrode lines in each column of pixel units are not serially connected to each other.

Besides, electrical inspection is often performed on the pixel array after the pixel units are formed. In the electrical inspection, voltages are often applied to the capacitor electrode lines. Due to formation of the capacitor electrode lines which can increase the aperture ratio of the pixel unit and mitigate the interference caused by the capacitive coupling effects, defects in the pixel array may not be detected during the electrical inspection. Hence, how to design the capacitor electrode lines in order not to erroneously or negligently detect the defects in the pixel array during the electrical inspection has become an important issue.

SUMMARY OF THE INVENTION

The invention is directed to a pixel array which does not affect detection of defects in a pixel array when an electrical inspection is performed.

The invention provides a pixel array including a plurality of data lines, a plurality of scan lines, a plurality of sub-pixel units, a plurality of capacitor electrode line sets, and a plurality of connecting structure sets. The data lines and the scan lines are disposed on a substrate. The sub-pixel units are disposed on the substrate in an array, wherein each of the sub-pixel units has at least one active device and at least one pixel electrode electrically connected to the active device, and the active device is electrically connected to a corresponding one of the scan lines and a corresponding one of the data lines. The capacitor electrode line sets are disposed on the substrate. Each of the capacitor electrode line sets has N capacitor electrode lines. The N capacitor electrode lines partially overlap with the pixel electrode of each of the sub-pixel units to form a plurality of storage capacitors, and N≥2. The N capacitor electrode lines in each of the capacitor electrode line sets are electrically connected to one another by each of the connecting structure sets, and there is no connecting structure between the capacitor electrode line sets having the connecting structures therein.

The invention further provides a pixel array including a substrate, a plurality of data lines, a plurality of scan lines, a plurality of sub-pixel units, a plurality of capacitor electrode lines, and a plurality of connecting structures. The substrate has a plurality of first regions and a plurality of second regions. The data lines and the scan lines are disposed on the substrate. The sub-pixel units are disposed on the substrate in an array, wherein each of the sub-pixel units has at least one active device and at least one pixel electrode electrically connected to the active device, and the active device is electrically connected to a corresponding one of the scan lines and a corresponding one of the data lines. The capacitor electrode lines are disposed on the substrate. Here, the capacitor electrode lines partially overlap with the pixel electrode of each of the sub-pixel units to form a plurality of storage capacitors. The connecting structures are located in the first regions to connect the capacitor electrode lines in the first regions, and no connecting structure is disposed in the second regions.

Based on the above, in the pixel array of the invention, the connecting structures are disposed in some but not all regions. Hence, when a common voltage is applied to the capacitor electrode lines during the electrical inspection on the pixel array, the capacitor electrode lines and the connecting structures do not together form a meshed circuit structure. As such, when there exist detects in the pixel array, the detects can be visually observed or detected.

It is to be understood that both the foregoing general descriptions and the following detailed embodiments are exemplary and are, together with the accompanying drawings, intended to provide further explanation of technical features and advantages of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
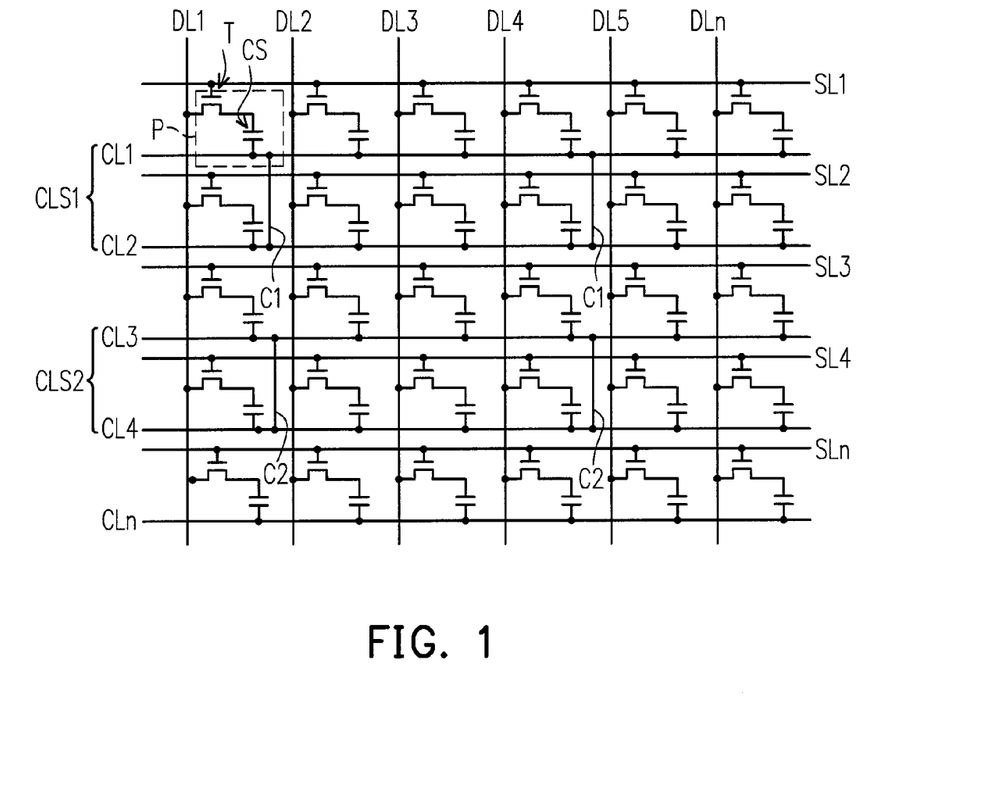
FIG. 1 is an equivalent circuit diagram illustrating a pixel array according to an embodiment of the invention.
Figure 2:
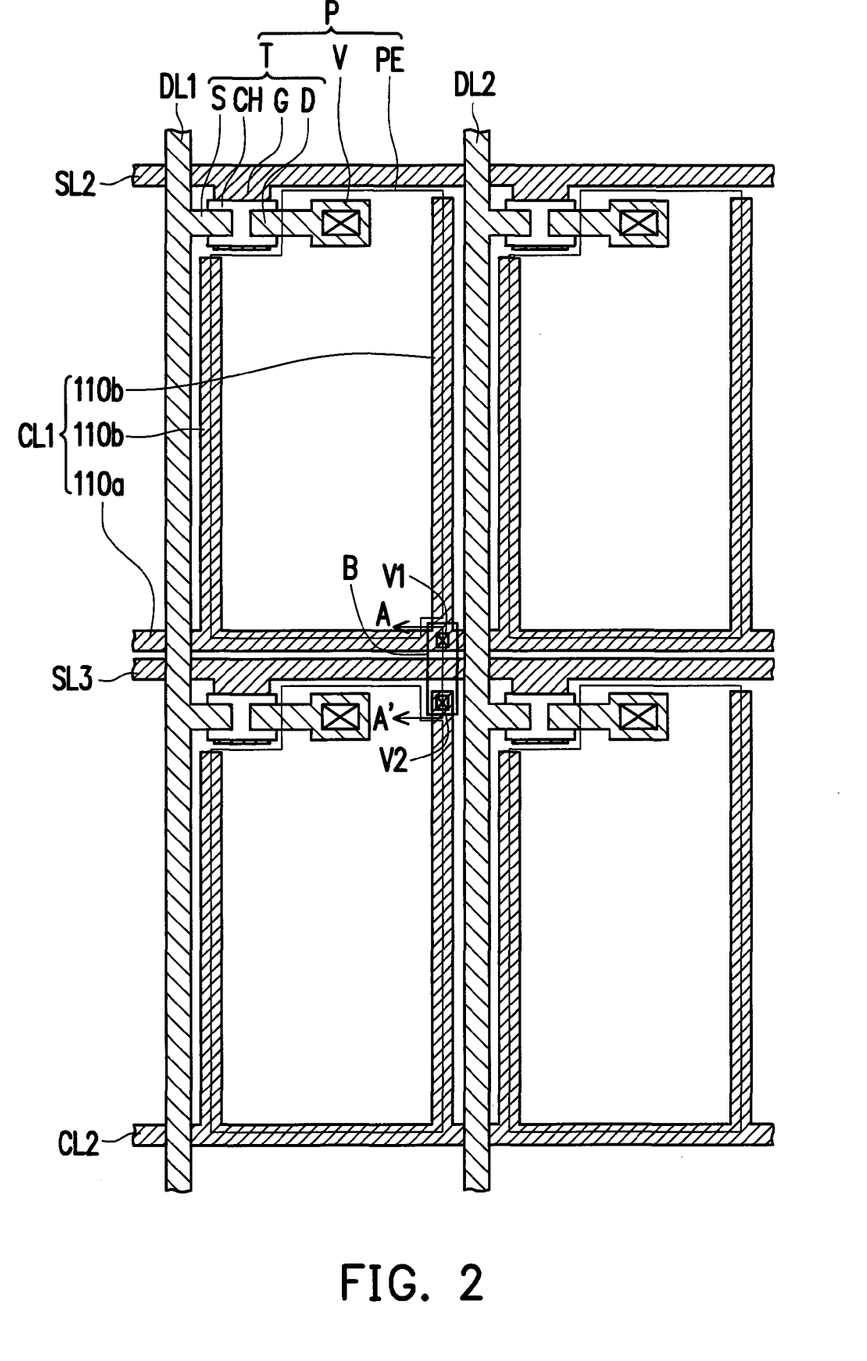
FIG. 2 is a schematic view partially illustrating the pixel array depicted in FIG. 1.
Figure 3:
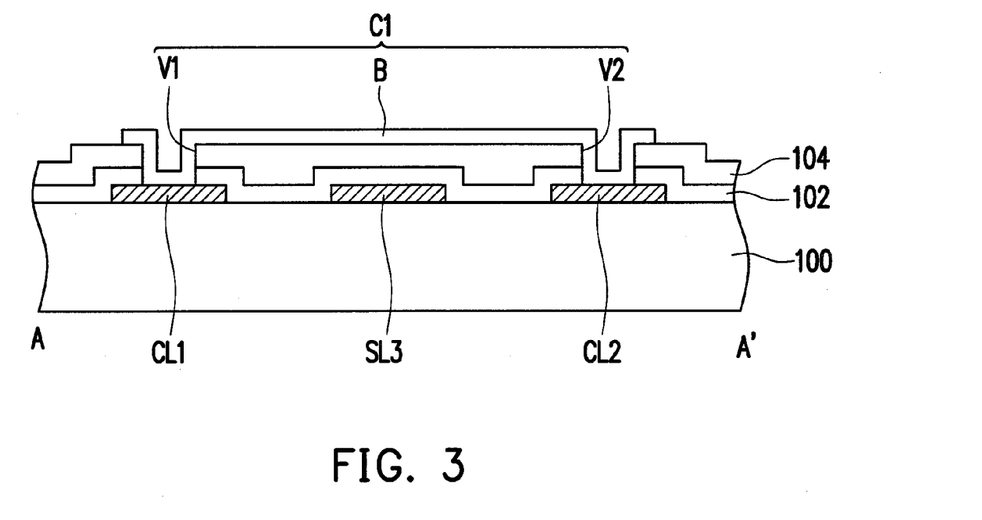
FIG. 3 is a schematic cross-sectional view taken along a sectional line A-A' depicted in FIG. 2.

FIG. 1 is an equivalent circuit diagram illustrating a pixel array according to an embodiment of the invention. FIG. 2 is a schematic view partially illustrating the pixel array depicted in FIG. 1. FIG. 3 is a schematic cross-sectional view taken along a sectional line A-A' depicted in FIG. 2. With reference to FIG. 1, FIG. 2, and FIG. 3, the pixel array of this embodiment includes a plurality of data lines DL1~DLn, a plurality of scan lines SL1~SLn, a plurality of sub-pixel units (also referred to as sub-pixel regions) P, a plurality of capacitor electrode line sets CLS1~CLS2, and a plurality of connecting structure sets C1~C2.

The data lines DL1~DLn and the scan lines SL1~SLn are disposed on a substrate 100. The substrate 100 can be made of glass, quartz, an organic polymer, a non-light-transmissive/reflective material (such as a conductive material, wafer, ceramics, or the like), or other suitable materials.

The data lines DL1~DLn and the scan lines SL1~SLn are interlaced. In other words, an extending direction of the data lines DL1~DLn is not parallel to an extending direction of the scan lines SL1~SLn, and it is favorable for the extending direction of the data lines DL1~DLn to be substantially perpendicular to the extending direction of the scan lines SL1~SLn. In addition, the scan lines SL1~SLn and the data lines DL1~DLn are in different layers. In consideration of electrical conductivity, the data lines DL1~DLn and the scan lines SL1~SLn are often made of metal materials with a single-layer structure or a multi-layer structure. However, the materials of the data lines DL1~DLn and the scan lines SL1~SLn are not limited to the aforesaid materials. Namely, the data lines DL1~DLn and the scan lines SL1~SLn can also be made of other conductive materials with the single-layer structure of the multi-layer structure. The metal material is, for example, an alloy, metal nitride, metal oxide, metal oxynitride, another appropriate material, or a layer in which the metal material and any other conductive material stacked to each other.

The sub-pixel units P are disposed on the substrate 100 in an array, wherein each of the sub-pixel units P has at least one active device T and at least one pixel electrode PE electrically connected to the active device T, and the active device T is electrically connected to a corresponding one of the scan lines SL1~SLn and a corresponding one of the data lines DL1~DLn.

In this embodiment, the active device T includes a gate electrode G, a semiconductor layer CH, a source electrode S, and a drain electrode D. The gate electrode G and the scan line SL1 in one of the sub-pixel units P as depicted in FIG. 1 are electrically connected to each other. The semiconductor layer CH is located above the gate electrode G. The source electrode S and the drain electrode D are located above the semiconductor layer CH, and the source electrode S is electrically connected to the data line DL1. The aforesaid active device T is a bottom-gate thin film transistor (TFT), for example; however, the invention is not limited thereto. In other embodiments of the invention, the active device T can also be a top-gate TFT, i.e. the semiconductor layer CH is located below the gate electrode G.

In this embodiment, the pixel electrode PE is electrically connected to the drain electrode D of the active device T through a contact window V. The pixel electrode PE can be a transparent conductive electrode, a reflective conductive electrode, or a combination thereof. A material of the transparent conductive electrode includes metal oxide, such as indium tin oxide (ITO), indium zinc oxide (IZO), aluminum tin oxide (ATO), aluminum zinc oxide (AZO), indium germanium, zinc oxide (IGZO), other suitable oxide, or a stacked layer having at least two of the above materials. A material of the reflective conductive electrode can be a material with reflectivity.

The capacitor electrode line sets CLS1~CLS2 are disposed on the substrate 100. In this embodiment, only two of the capacitor electrode line sets CLS1~CLS2 are depicted in the drawings to clearly describe the invention. Note that the number of the capacitor electrode line sets is not limited in the invention. The capacitor electrode line set CLS1 of this embodiment has a plurality of capacitor electrode lines CL1 and CL2, and the capacitor electrode line set CLS2 has a plurality of capacitor electrode lines CL3 and CL4. Similarly, the number of the capacitor electrode lines in each of the capacitor electrode line sets is not limited in the invention. In principle, the number N of the capacitor electrode lines in each of the capacitor electrode line sets is greater than or equal to 2 (N≥2).

According to this embodiment, an extending direction of the capacitor electrode lines CL1~CLn is substantially parallel to the extending direction of the scan lines SL1~SLn, and the capacitor electrode lines CL1~CLn and the scan lines SL1~SLn are in the same layer. In addition, the capacitor electrode lines CL1~CLn and the scan lines SL1~SLn can be made of the same material. In consideration of electrical conductivity, the capacitor electrode lines CL1~CLn are often made of metal materials with a single-layer structure or a multi-layer structure. However, the capacitor electrode lines CL1~CLn can also be made of other conductive materials with the single-layer structure or the multi-layer structure in other embodiments, which should not be construed as a limitation to the invention. The metal material is, for example, an alloy, metal nitride, metal oxide, metal oxynitride, another appropriate material, or a layer in which the metal material and any other conductive material stacked to each other.

In this embodiment, each of the capacitor electrode lines CL1~CLn includes a connecting portion 110a and a plurality of branch portions 110b. As exemplarily shown in FIG. 2, the capacitor electrode line CL1 includes the connecting portion 110a and the branch portions 110b. The connecting portion 110a is disposed substantially in parallel with the scan lines SL1~SLn. The branch portions 110b are connected to the connecting portion 110a and disposed substantially in parallel with the data lines DL1~DLn. In this embodiment, the branch portions 110b are located at sides of the data lines DL1~DLn. That is to say, the branch portions 110b do not overlap with the data lines DL1~DLn. Each of the capacitor electrode lines CL1~CLn in other embodiments of the invention can also have no branch portions 110b.

Moreover, the capacitor electrode lines CL1~CLn respectively overlap with the part of the pixel electrodes PE of the sub-pixel units P to form a plurality of storage capacitors CS. Wherein the storage capacitors CS are not a display media layer capacitor (such as liquid crystal (LC) capacitor), the LC capacitor is formed by the pixel electrode PE on the substrate 100 and transparent electrode (not shown) on a surface of another substrate (not shown). As exemplarily shown in FIG. 2, the capacitor electrode line CL1 (the connecting portion 110a and the branch portions 110b or the connecting portion 110a alone) partially overlaps with the pixel electrode PE of the sub-pixel unit P to form the storage capacitor CS. Therefore, the capacitor electrode line CL1 serves as the lower electrode of the storage capacitor CS, the pixel electrode PE serves as the upper electrode of the storage capacitor CS, and an insulating layer (not shown) sandwiched between the capacitor electrode line CL1 and the pixel electrode PE serves as the capacitive dielectric layer. The capacitor electrode lines CL1~CLn are electrically connected to a specific voltage, such as a common voltage (Vcom), not limited it.

The connecting structure sets C1~C2 are disposed on the substrate 100. In this embodiment, only two of the connecting structure sets C1~C2 are depicted in the drawings to clearly describe the invention. Note that the number of the connecting structure sets is not limited in this invention. Particularly, the N capacitor electrode lines in each of the capacitor electrode line sets CLS1~CLS2 are electrically connected to one another by each of the connecting structure sets C1~C2, and there is no connecting structure located between the capacitor electrode line sets CLS1~CLS2 having the connecting structures therein. To be more specific, the connecting structure C1 is adopted to electrically connect the capacitor electrode lines CL1 and CL2 in the capacitor electrode line set CLS1. The connecting structure C2 is adopted to electrically connect the capacitor electrode lines CL3 and CL4 in the capacitor electrode line set CLS2. There is no connecting structure disposed between the capacitor electrode line sets CLS1 and CLS2.

More particularly, as indicated in FIG. 3, which is a cross-sectional view taken along the sectional line A-A' depicted in FIG. 2, the connecting structure C1 includes contact windows V1 and V2 and a bridge layer B. The contact windows V1 and V2 are respectively formed in insulating layers 102 and 104 located above partly of the capacitor electrode lines CL1 and CL2. The bridge layer B is disposed on the insulating layer 104 and electrically connected to the capacitor electrode lines CL1 and CL2 through the contact windows V1 and V2, respectively. In this embodiment, the bridge layer B of the connecting structure C1 and the pixel electrode PE are in the same layer and made of the same material, for instance. However, the invention is not limited thereto. According to other embodiments of the invention, the bridge layer B of the connecting structure C1 can also be another film layer. For instance, the data lines DL1~DLn are in the bridge layer B, or the bridge layer B is a third conductive layer in which none of the pixel electrode PE, the data lines DL1~DLn, and the scan lines SL1~SLn is disposed. Here, the third conductive layer can be made of materials with the single-layer structure or the multi-layer structure (which can be referred to as the materials of the data lines DL or the materials of the scan lines SL) and can be selectively disposed under or above the pixel electrode PE.

In this embodiment, the capacitor electrode line set CLS1, for example, has two capacitor electrode lines CL1~CL2 electrically connected to each other by the connecting structure C1. Note that neither the number of the capacitor electrode lines in each of the capacitor electrode line sets nor the number of the connecting structure C1 is limited in this invention. Besides, in the embodiment shown in FIG. 1, one connecting structure C1 or C2 is disposed in every three of the sub-pixel units P. However, the invention is not limited thereto. According to other embodiments of the invention, one connecting structure C1 or C2 can also be disposed in every two of the sub-pixel units P, every four of the sub-pixel units P, or more of the sub-pixel units P. The sub-pixel units P in which the connecting structure C2 is disposed can be selectively corresponding to the sub-pixel units P in which the connecting structure C1 is disposed or not corresponding to the connecting structure C1.

As described above, in the pixel array of this embodiment, the N capacitor electrode lines in each of the capacitor electrode line sets CLS1~CLS2 are electrically connected to one another by each of the connecting structure sets C1~C2, and there is no connecting structure located between the capacitor electrode line sets CLS1~CLS2 having the connecting structures therein. Hence, the connecting structures are not formed in the entire pixel array of this embodiment. As a matter of fact, the connecting structures are disposed in some but not all regions. Hence, when a specific voltage (such as common voltage) is applied to the capacitor electrode lines CL1~CLn during the electrical inspection on the pixel array, the capacitor electrode lines CL1~CLn and the connecting structures C1~C2 do not together form a meshed circuit structure. When there are defects between the capacitor electrode lines and the data lines in the pixel array, it is still possible to visually observe and detect the locations of the defects.

Note that in order to balance the polarities of the coupled capacitor electrode lines in a display panel driven in a dot inversion manner, it is preferable to connect two capacitor electrode lines respectively with positive and negative polarities, such that the polarities of the coupled capacitor electrode lines can be balanced. Namely, in the display panel driven in the dot inversion manner, the number of the capacitor electrode lines in each of the capacitor electrode line sets CLS1~CLS2 is preferably two, and each of the capacitor structures C1 and C2 is electrically connected to two capacitor electrode lines. There is no connecting structure between the capacitor electrode line sets CLS1 and CLS2. Moreover, in consideration of the positioning capabilities of machines performing the inspection on the pixel array, the number of the capacitor electrode lines in each of the capacitor electrode line sets CLS1~CLS2 is preferably two. Namely, every two capacitor electrode lines have one connecting structure.

The branch portions 110b of the common capacitor electrode lines CL1~CLn as described in the embodiments depicted in FIG. 1 to FIG. 3 are located at the sides of the data lines DL1~DLn. However, the invention is not limited thereto. In other embodiments of the invention, the branch portions 110b of the common capacitor electrode lines CL1~CLn can have other configurations.

Figure 4:
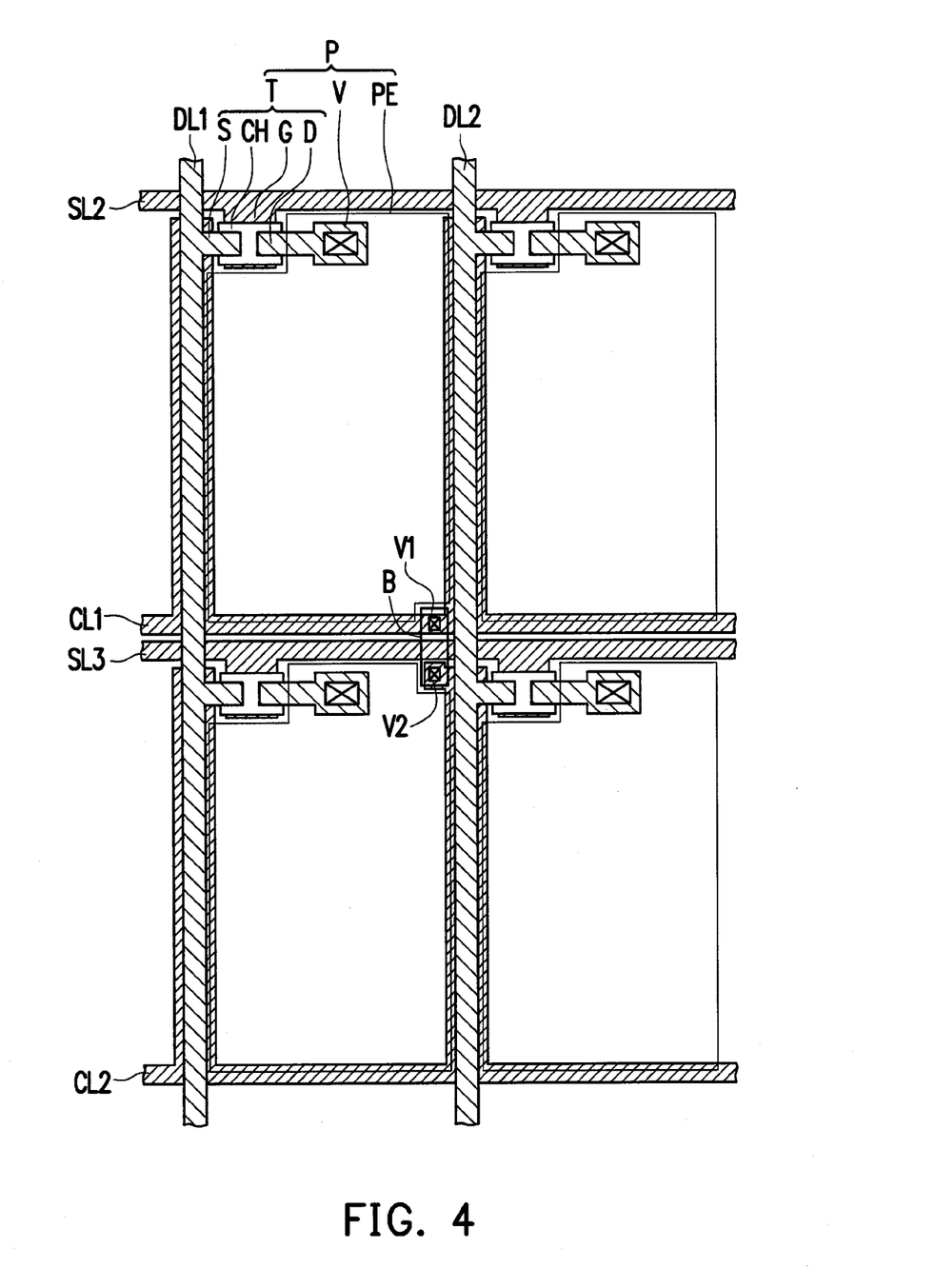
FIG. 4 is a schematic top view partially illustrating a pixel array according to another embodiment of the invention.

FIG. 4 is a schematic top view partially illustrating a pixel array according to another embodiment of the invention. The embodiment shown in FIG. 4 is similar to the embodiment shown in FIG. 2, so that components identical to those in FIG. 2 are represented by the same numerals in FIG. 4 and not repeated herein. The difference between the embodiments respectively depicted in FIG. 4 and FIG. 2 rests in that the branch portions 110b of the common capacitor electrode lines CL1~CLn at least partially overlap with the data lines DL1~DLn according to the embodiment depicted in FIG. 4. In other words, the branch portions 110b of the common capacitor electrode lines CL1~CLn are disposed below the data lines DL1~DLn and at least partially overlap with the data lines DL1~DLn. Said configuration of the common capacitor electrode lines CL1~CLn can further increase the aperture ratio of the pixel structure. Preferably, the branch portions 110b of the common capacitor electrode lines CL1~CLn are disposed right below the data lines DL1~DLn and overlap with the data lines DL1~DLn, which is however not limited in this invention.

Figure 5:
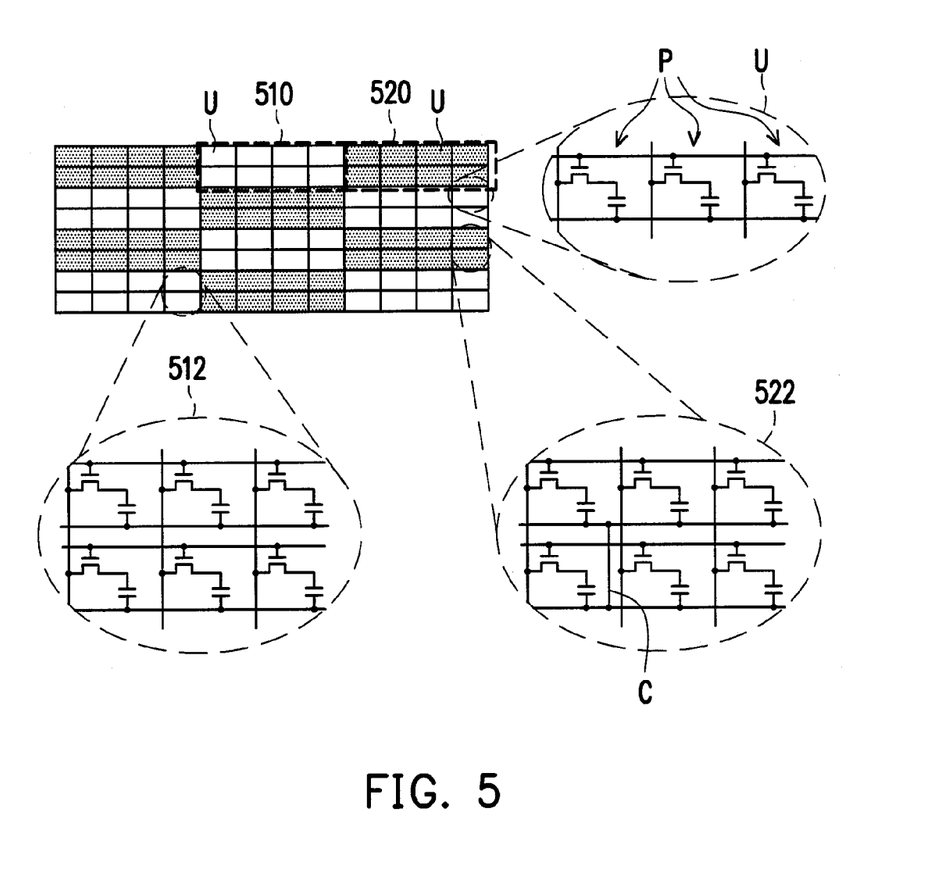
FIG. 5 is a schematic view illustrating a pixel array according to an embodiment of the invention.

FIG. 5 is a schematic view illustrating a pixel array according to an embodiment of the invention. The embodiment shown in FIG. 5 is similar to the embodiment shown in FIG. 1, so that components identical to those in FIG. 1 are represented by the same numerals in FIG. 5 and not repeated herein. The difference between the embodiments respectively depicted in FIG. 5 and FIG. 1 rests in the configuration of the connecting structures.

As indicated in FIG. 5, the substrate of this embodiment can be divided into a plurality of first regions 520 and a plurality of second regions 510, and each of the first and the second regions 520 and 510 has a plurality of pixel units (also referred to as pixel regions) U. In the embodiment depicted in FIG. 5, each of the pixel units U has three sub-pixel units (also referred to as sub-pixel regions) P, for example. However, the invention is not limited thereto. According to other embodiments of the invention, one individual pixel unit U can have two, four, or more sub-pixel units P. The structure of each of the sub-pixel units P can be that of the sub-pixel unit P as depicted in FIG. 1 (FIG. 2) or FIG. 4.

In particular, as described in the embodiment shown in FIG. 5, the numeral 522 represents a schematic partially enlarged view of the first regions 520, and the numeral 512 represents a schematic partially enlarged view of the second regions 510. The connecting structures C are disposed within the first regions 520 as shown in the enlarged area marked as 522 and are adopted to connect the capacitor electrode lines CL1~CLn located in the first regions 520. Additionally, there is no connecting structure C in the second regions 510 (see the enlarged area marked as 512).

Similarly, in the first regions 520 where the connecting structures C are disposed, the number of the capacitor electrode lines CL1~CLn connected to one another by the connecting structures C is not limited in this invention, nor is the number of the connecting structures C in each of the first regions 520. According to an embodiment of the invention, the configuration of the connecting structures as shown in FIG. 1 can be applied to the configuration of the connecting structures in the first regions 520 as illustrated in FIG. 5. That is to say, in the first regions 520, the capacitor electrode lines are grouped into a plurality of capacitor electrode line sets. Each of the capacitor electrode line sets has N capacitor electrode lines, and at least one connecting structure C is disposed among the N capacitor electrode lines in each of the capacitor electrode line sets. Besides, there is no capacitor electrode line between each of the capacitor electrode line sets.

The first regions 520 and the second regions 510 can be interlaced and arranged on the substrate. The first regions 520 and the second regions 510 can be evenly distributed on the substrate. The first regions 520 and the second regions 510 can have various arrangement and area ratios because the capacitor electrode lines driven in different manner may have reverse polarities after being coupled, different defects may arise, and machines performing the inspection may have different positioning capabilities. Namely, in addition to the way to divide the substrate into the first regions 520 and the second regions 510 as shown in FIG. 5, other ways to divide the substrate as shown in FIG. 6 or FIG. 7 are also applicable in other embodiments of the invention.

Figure 6:
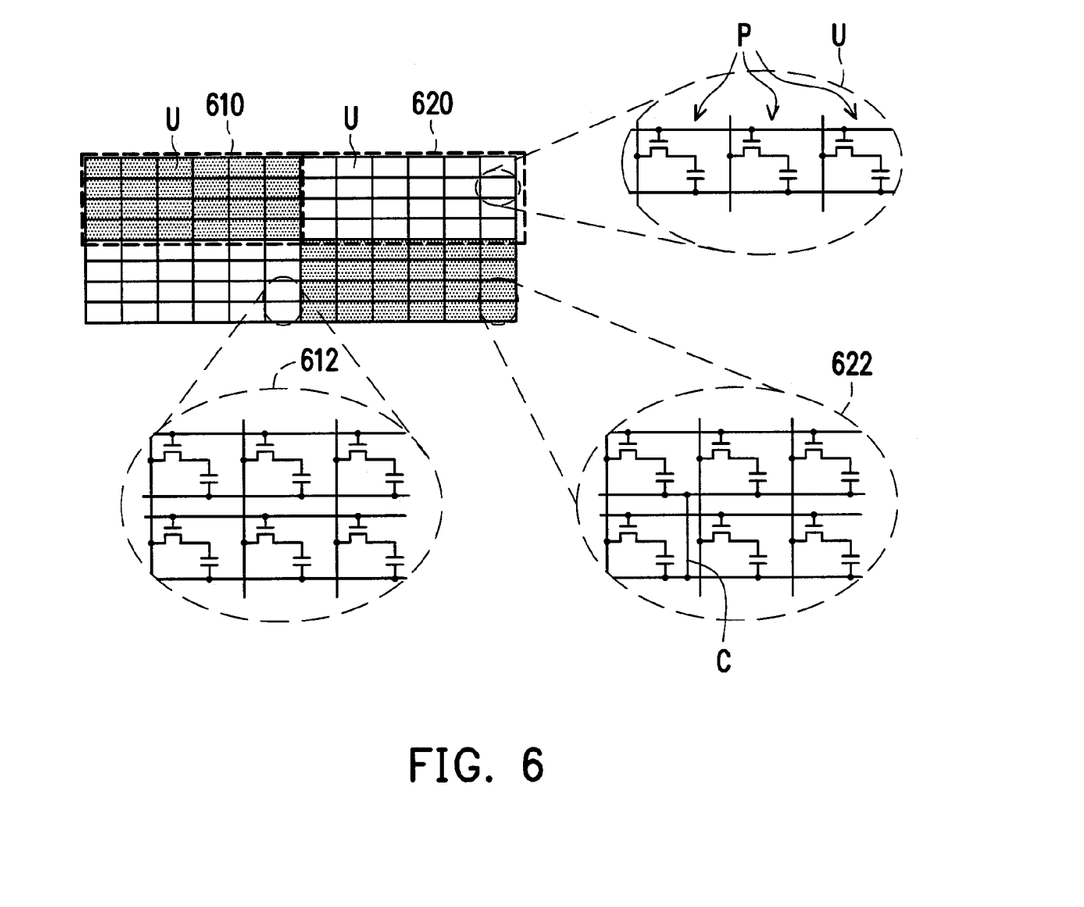
FIG. 6 is a schematic view illustrating a pixel array according to an embodiment of the invention.

As indicated in FIG. 6, the substrate can be divided into a plurality of first regions 620 and a plurality of second regions 610, and each of the first and the second regions 620 and 610 has a plurality of pixel units (also referred to as pixel regions) U. Similarly, each of the pixel units U has three sub-pixel units (also referred to as sub-pixel regions) P, for example. The numeral 622 represents a schematic partially enlarged view of the first regions 620, and the numeral 612 represents a schematic partially enlarged view of the second regions 610. The connecting structures C are disposed in the first regions 620 as shown in the enlarged area marked as 622 and are adopted to connect the capacitor electrode lines CL1~CLn located in the first regions 620. By contrast, there is no connecting structure C in the second regions 610 (see the enlarged area marked as 612).

Figure 7:
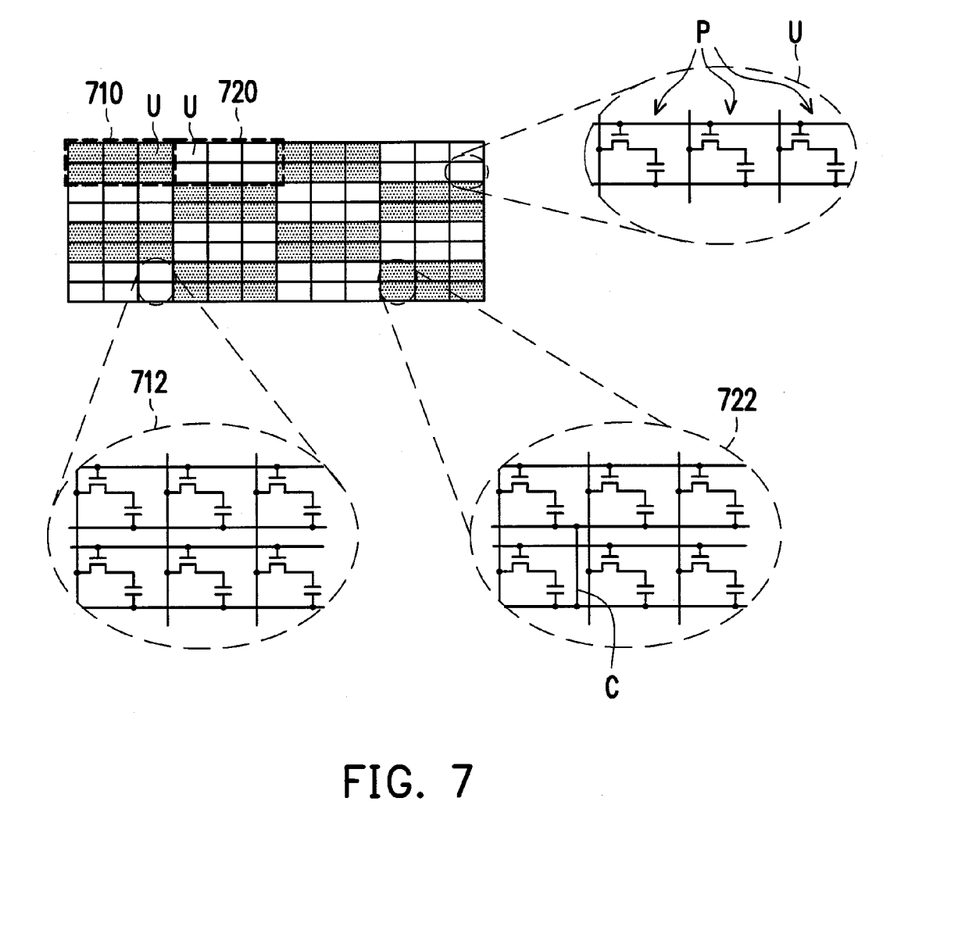
FIG. 7 is a schematic view illustrating a pixel array according to an embodiment of the invention.

As indicated in FIG. 7, the substrate can be divided into a plurality of first regions 720 and a plurality of second regions 710, and each of the first and the second regions 720 and 710 has a plurality of pixel units (also referred to as pixel regions) U. Similarly, each of the pixel units U has three sub-pixel units (also referred to as sub-pixel regions) P, for example. The numeral 722 represents a schematic partially enlarged view of the first regions 720, and the numeral 712 represents a schematic partially enlarged view of the second regions 710.

The connecting structures C are disposed in the first regions 720 as shown in the enlarged area marked as 722 and are adopted to connect the capacitor electrode lines CL1~CLn located in the first regions 720. By contrast, there is no connecting structure C in the second regions 710 (please refer to the enlarged area marked as 712).

Based on the design requirements, the pixel units U in the first regions 520, 620, and 720 and in the second regions 510, 610, and 710 shown in FIG. 5 to FIG. 7 can be represented by an O×P matrix. Here, O and P are positive integers, and one of O and P is greater than 1.

In light of the foregoing, the connecting structures are not formed in the entire pixel array of this invention. As a matter of fact, the connecting structures are disposed in some but not all regions. Hence, when a specific voltage (such as common voltage) is applied to the capacitor electrode lines during the electrical inspection on the pixel array, the capacitor electrode lines and the connecting structures do not together form a meshed circuit structure. To be more specific, when there are defects between the capacitor electrode lines and the data lines in the pixel array, it is still possible to visually observe and detect the locations of the defects.

In addition, the capacitor electrode lines in the pixel array of this invention are disposed at the sides of the data lines or below the data lines, so as to increase the aperture ratio of the entire pixel array.

It will be apparent to those skilled in the art that various modifications and variations can be made to the structure of the invention without departing from the scope or spirit of the present invention. In view of the foregoing, it is intended that the invention cover modifications and variations of the invention provided they fall within the scope of the following claims and their equivalents.

What is claimed is:
1. A pixel array comprising:
a plurality of data lines and a plurality of scan lines, the data lines and the scan lines being disposed on a substrate;
a plurality of sub-pixel units disposed on the substrate in an array, wherein each of the sub-pixel units has at least one active device and at least one pixel electrode electrically connected to the at least one active device, and the at least one active device is electrically connected to a corresponding one of the scan lines and a corresponding one of the data lines;
a plurality of capacitor electrode line sets disposed on the substrate, wherein each of the capacitor electrode line sets has N capacitor electrode lines, the N capacitor electrode lines partially overlap with the at least one pixel electrode of each of the sub-pixel units to form a plurality of storage capacitors, and N≥2; and
a plurality of connecting structure sets made of a conductive material, the N capacitor electrode lines in each of the capacitor electrode line sets being electrically connected to one another by each of the connecting structure sets which crosses over the corresponding one of the scan lines so as to have the conductive material among the N capacitor electrode lines in each of the capacitor electrode line sets and crossing over the corresponding scan line, wherein there is no connecting structure disposed between the capacitor electrode line sets such that each of the capacitor electrode line sets is not connected to the other capacitor electrode line sets and the corresponding one of the scan lines is not crossed over by any connecting structure set so as to have no conductive material among the capacitor electrode line sets and crossing over the corresponding scan line.

2. The pixel array of claim 1, wherein the substrate has a plurality of first regions and a plurality of second regions, the connecting structure sets are disposed in the first regions to connect the N capacitor electrode lines in the first regions, and no connecting structure is disposed in the second regions.

3. The pixel array of claim 2, wherein the first regions and the second regions are interlaced arrangement.

4. The pixel array of claim 2, wherein the first regions and the second regions are evenly distributed on the substrate.

5. The pixel array of claim 1, wherein each of the N capacitor electrode lines comprises:
a connecting portion disposed substantially in parallel with the scan lines; and
a plurality of branch portions connected to the connecting portion and disposed substantially in parallel with the data lines.

6. The pixel array of claim 5, wherein the branch portions and the data lines are at least partially overlapped.

7. The pixel array of claim 5, wherein the branch portions are located at sides of the data lines.

8. A pixel array comprising:
a substrate having a plurality of first regions and a plurality of second regions;
a plurality of data lines and a plurality of scan lines, the data lines and the scan lines being disposed on the substrate;
a plurality of sub-pixel units disposed on the substrate in an array, wherein each of the sub-pixel units has at least one active device and at least one pixel electrode electrically connected to the at least one active device, and the at least one active device is electrically connected to a corresponding one of the scan lines and a corresponding one of the data lines;
a plurality of capacitor electrode lines disposed on the substrate, wherein the capacitor electrode lines partially overlap with the at least one pixel electrode of each of the sub-pixel units to form a plurality of storage capacitors; and
a plurality of connecting structures made of a conductive material located in the first regions to connect the capacitor electrode lines in the first regions and each connecting structure crosses over the corresponding one of the scan lines so as to have the conductive material among the capacitor electrode lines in the first regions and crossing over the corresponding scan line, wherein no connecting structure is disposed in the second regions such that the capacitor electrode lines in the second regions are not connected to one another and the corresponding one of the scan lines is not crossed over by any connecting structure so as to have no conductive material among the capacitor electrode lines in the second regions and crossing over the corresponding scan line.

9. The pixel array of claim 8, wherein the first regions and the second regions are interlaced arrangement.

10. The pixel array of claim 8, wherein the first regions and the second regions are evenly distributed on the substrate.

11. The pixel array of claim 8, wherein each of the capacitor electrode lines comprises:
a connecting portion disposed substantially in parallel with the scan lines; and
a plurality of branch portions connected to the connecting portion and disposed substantially in parallel with the data lines.

12. The pixel array of claim 11, wherein the branch portions and the data lines are at least partially overlapped.

13. The pixel array of claim 11, wherein the branch portions are located at sides of the data lines.

14. A pixel array comprising:
at least two sub-pixel groups disposed on a substrate and comprising a first sub-pixel group and a second sub-pixel group arranged along a direction, each of the sub-pixel groups having at least two sub-pixels, and each sub-pixel having at least one active device, at least one line comprising at least one scan line and at least one data line, and at least one pixel electrode, wherein a gate of the active device is electrically connected to the scan line, a source of the active device is electrically connected to the data line, and a drain of the active device is electrically connected to the pixel electrode;
at least two capacitor electrode line sets disposed on the substrate and comprising a first capacitor electrode line set and a second capacitor electrode line set, wherein each of the capacitor electrode line sets has at least two capacitor electrode lines, and the capacitor electrode lines of each capacitor electrode line set cross the sub-pixels correspondingly; and
at least one connecting structure made of a conductive material on the substrate, wherein the connecting structure connects the capacitor electrode lines in the sub-pixels of the first sub-pixel group or the capacitor electrode lines in the sub-pixels of the second sub-pixel group, which crosses over the line electrically connected to the active device so as to have the conductive material among the capacitor electrode lines in the sub-pixels of the first sub-pixel group or the capacitor electrodes in the sub-pixel of the second sub-pixel group and crossing over the line electrically connected to the active device, and the connecting structure does not connect the capacitor electrode line in one of the sub-pixels of the first sub-pixel group and the capacitor electrode line in one of the sub-pixels of the second sub-pixel group such that the line electrically connected to the active device is not crossed over by any connecting structure so as to have no conductive material among the capacitor electrode line in one of the sub-pixels of the first sub-pixel group and the capacitor electrode line in one of the sub-pixels of the second sub-pixel group and crossing over the line electrically connected to the active device.

15. The pixel array of claim 14, wherein the direction is a row direction or a column direction.

16. The pixel array of claim 14, wherein each of the capacitor electrode lines further comprises a plurality of branch portions connected to a connecting portion.

17. The pixel array of claim 14, wherein the line crossed over by the connecting structure is the scan line.

18. A pixel array comprising:
at least two sub-pixel groups disposed on a substrate and comprising a first sub-pixel group and a second sub-pixel group, each of the sub-pixel groups having at least three sub-pixels, and each sub-pixel having at least one active device, at least one line comprising at least one scan line and at least one data line, and at least one pixel electrode, wherein a gate of the active device is electrically connected to the scan line, a source of the active device is electrically connected to the data line, and a drain of the active device is electrically connected to the pixel electrode;
at least two capacitor electrode line sets disposed on the substrate and comprising a first capacitor electrode line set and a second capacitor electrode line set, wherein each of the capacitor electrode line sets has at least three capacitor electrode lines, and the capacitor electrode lines of each capacitor electrode line set cross the sub-pixels correspondingly; and at least one connecting structure made of a conductive material on the substrate, wherein the connecting structure connects the capacitor electrode line of one of the sub-pixels in the first sub-pixel group and the capacitor electrode line of one of the sub-pixels in the second sub-pixel group, which crosses over the line electrically connected to the active device so as to have the conductive material among the capacitor electrode line of one of the sub-pixels in the first sub-pixel group and the capacitor electrode line of one of the sub-pixels in the second sub-pixel group and crossing over the line electrically connected to the active device, and the connecting structure does not connect the capacitor electrode lines of the other sub-pixels in the first sub-pixel group and the capacitor electrode lines of the other sub-pixels in the second sub-pixel group such that the line electrically connected to the active device is not crossed over by any connecting structure so as to have no conductive material among the capacitor electrode lines of the other sub-pixels in the first sub-pixel group and the capacitor electrode lines of the other sub-pixels in the second sub-pixel group and crossing over the line electrically connected to the active device.

19. The pixel array of claim 18, wherein each of the capacitor electrode lines further comprises a plurality of branch portions connected to a connecting portion.

20. The pixel array of claim 18, wherein the line crossed over by the connecting structure is the scan line.

21. The pixel array of claim 20, wherein each of the capacitor electrode lines further comprises a plurality of branch portions connected to a connecting portion.

22. The pixel array of claim 20, wherein the line corresponding to the active device is one of at least one scan lines.

23. A pixel array comprising:
at least one sub-pixel group disposed on a substrate and comprising a first sub-pixel group and a second sub-pixel group, the sub-pixel group having at least two sub-pixels, and each sub-pixel having at least one active device, wherein the active device is connected to a correspond line;

at least two capacitor electrode lines disposed on the substrate and comprising a first capacitor electrode line and a second capacitor electrode line, wherein the capacitor electrode lines of each capacitor electrode lines cross the sub-pixels correspondingly; and at least one connecting structure made of a conductive material on the substrate, wherein the connecting structure connects the capacitor electrode line of one of the sub-pixels in the first sub-pixel group or the capacitor electrode line of one of the sub-pixels in the second sub-pixel group, and the connecting structure does not connect the capacitor electrode lines of the other sub-pixels in the first sub-pixel group or the capacitor electrode lines of the other sub-pixels in the second sub-pixel group, wherein the correspond line corresponding to the active device is crossed over when there is the connecting structure, and the correspond line corresponding to the active device is not crossed over where there is no connecting structure, and wherein the conductive material is among the capacitor electrode line of one of the sub-pixels in the first sub-pixel group or the capacitor electrode line of one of the sub-pixels in the second sub-pixel group so as to have the conductive materials crossing over the correspond line electrically connected to the active device, and no conductive material is among the capacitor electrode lines of the other sub-pixels in the first sub-pixel group or the capacitor electrode lines of the other sub-pixels in the second sub-pixel group so as to have no conductive materials crossing over the correspond line electrically connected to the active device.

* * * * *